(12) United States Patent
Westphal et al.

(10) Patent No.: US 10,600,114 B2
(45) Date of Patent: Mar. 24, 2020

(54) MANUFACTURE FOR PROVIDING ACCESS TO PRODUCT INFORMATION AND RELATED FUNCTIONALITIES

(71) Applicant: W.W. Grainger, Inc., Lake Forest, IL (US)

(72) Inventors: Geoffry A. Westphal, Evanston, IL (US); Jerry Shim, Park Ridge, IL (US); Kelsey Heffren, Chicago, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 622 days.

(21) Appl. No.: 15/183,255

(22) Filed: Jun. 15, 2016

(65) Prior Publication Data

US 2016/0300295 A1 Oct. 13, 2016

Related U.S. Application Data

(63) Continuation-in-part of application No. 13/778,356, filed on Feb. 27, 2013, now Pat. No. 9,418,379.

(60) Provisional application No. 61/745,088, filed on Dec. 21, 2012.

(51) Int. Cl.
*G06Q 30/00* (2012.01)
*G06Q 30/06* (2012.01)
*H04L 29/08* (2006.01)

(52) U.S. Cl.
CPC ..... *G06Q 30/0643* (2013.01); *G06Q 30/0601* (2013.01); *G06Q 30/0625* (2013.01); *G06Q 30/0631* (2013.01); *G06Q 30/0633* (2013.01); *G06Q 30/0641* (2013.01); *H04L 67/02* (2013.01)

(58) Field of Classification Search
CPC ................ G06Q 30/0601–0645; G06Q 30/08
USPC ................................. 705/26.1–27.2
See application file for complete search history.

(56) References Cited

U.S. PATENT DOCUMENTS

| | | | |
|---|---|---|---|
| 2008/0091546 A1* | 4/2008 | Kirovski | G06Q 30/0603 705/26.64 |
| 2011/0078487 A1* | 3/2011 | Nielsen | G06Q 30/02 714/2 |
| 2013/0085894 A1* | 4/2013 | Chan | G06Q 30/02 705/26.64 |

OTHER PUBLICATIONS

Bargiu, Eloisa et al., Exploiting web scraping in a collaborative filtering-based approach to web advertising, (2012), Artificial Intelligence Research, accessed at [https://pdfs.semanticscholar.org/25cf/21117f60d80b32c6d2868defc39e39f74109.pdf] on Nov. 8, 2019. (Year: 2012).*

* cited by examiner

*Primary Examiner* — Jeffrey A. Smith
*Assistant Examiner* — Lindsey B Smith
(74) *Attorney, Agent, or Firm* — Greenberg Traurig, LLP

(57) ABSTRACT

A system and method for allowing a user to quickly access product information and/or commerce functionalities as related to one or more products that are associated with an electronic document, such as a web page, that is currently being viewed by the user in an electronic document viewing program, such as an Internet browser.

9 Claims, 3 Drawing Sheets

MANUFACTURE FOR PROVIDING ACCESS TO PRODUCT INFORMATION AND RELATED FUNCTIONALITIES

RELATED APPLICATION INFORMATION

This application is a continuation-in-part of U.S. application Ser. No. 13/778,356, filed on Feb. 27, 2013, which application, in turn, claims the benefit of U.S. Provisional Application No. 61/745,088, filed on Dec. 21, 2012, the disclosures of which are incorporated herein by reference in its entirety.

BACKGROUND

It is common for online users to browse the Internet, whether for the purpose of general entertainment or for the specific purpose of looking for product that the online user might be interested in purchasing. It is seen, however, that such browsing activities do not result in sales of product to a degree that might otherwise be obtained if such online users were able to quickly and seamlessly connect to a vendor of product from a webpage (or other electronic document) that is currently being viewed by such online users.

SUMMARY OF THE INVENTION

The following describes a system and method for quickly and seamlessly providing an online user with product related information and/or commerce related functionalities that are made available to users by a vendor of product. By providing the user, i.e., a potential user, with access to such information and functionalities, it is believed that sales of product by the vendor of product can be substantially increased. While not intended to be limiting, the information and commerce related functionalities described hereinafter may be made available to users via the use of a program extension, such as a browser plug-in or the like, that is adapted to use information that is associated with an electronic document that is currently being viewed by the user, such as a web page, to alter or otherwise supplement the electronic document, for example via use of a pop-up display window, by opening another tab in a browser window, or the like, to thereby provide the user with access to product related information and/or with links to one or more commerce related functionalities as provided by the vendor.

The product related information as provided by the vendor can include one or more of an image of a product, pricing information, availability information, product description information, product ratings information, product review information, etc.

The commerce related functionalities as provided by the vendor can include one or more of links for use in placing product into an online shopping cart, causing a display of a Product Details page; causing a display of a catalog page from a catalog, transmitting a message to a recipient containing product related information, adding product to a list, causing a display of a product MSDS sheet, invoking a selection guide, causing a display of product accessories, causing a display of a list of locations at which product is available for purchase, causing a display of product repair information, causing a display of a discount offer associated with product, invoking additional searching or refining tools, or the like as generally disclosed in U.S. Published Application No. 2012/0259730 which is incorporated herein by reference in its entirety.

Preferably, the commerce related functionalities are linked to the product related information, e.g., the product that is the subject of the product related information would be the product that is addable to the shopping cart, the product for which accessories would be shown, the product for which availability would be displayed, etc.

Preferably, the product related information and commerce related functionalities are provided to the user in a manner that allows the user to continually access the electronic document, e.g., the product related information and/or commerce related functionalities is made available to the user in a manner that does not require the user to be navigated away from the electronic document that is currently being viewed.

Preferably, the product related information and commerce related functionalities provided to a user are relevant to an image, product descriptor(s), or the like that are determined to be of interest to the user. In this regard, user interest in a product can be directly indicated by the user highlighting or otherwise selecting/mousing over an image and/or text within the electronic document being viewed and/or can be inferred by, for example, sensing that the user has positioned or left a cursor over an image or text (or in the area of an image or text) within the electronic document for a predetermined period of time. While the forgoing provides a general explanation of the subject invention, a better understanding of the objects, advantages, features, properties and relationships of the subject invention will be obtained from the following detailed description and accompanying drawings which set forth illustrative embodiments and which are indicative of the various ways in which the principles of the subject invention may be employed.

BRIEF DESCRIPTION OF THE DRAWINGS

For a better understanding of the subject invention, reference may be had to preferred embodiments shown in the attached drawings in which.

DETAILED DESCRIPTION

Figure 1:
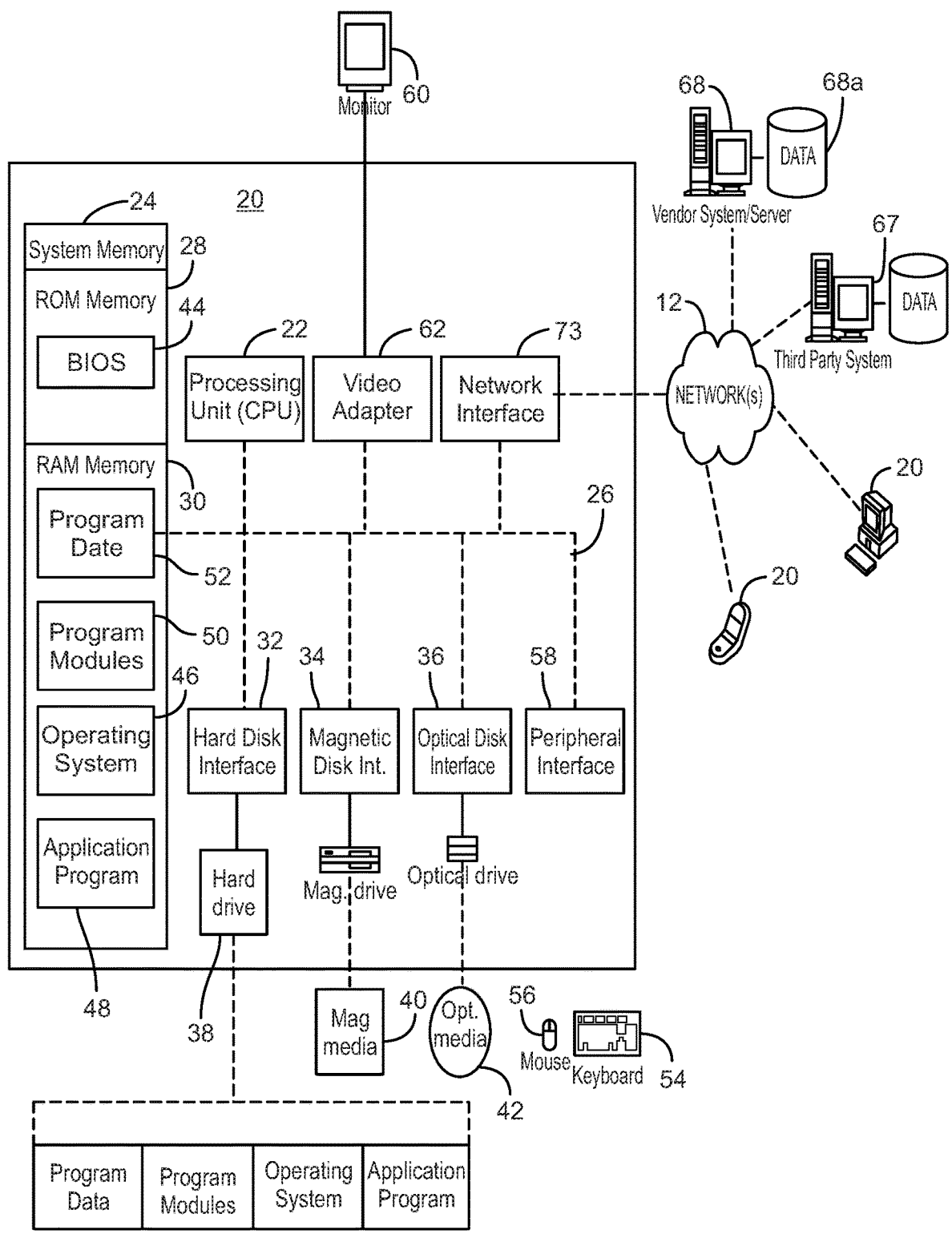
FIG. 1 is a block diagram illustrating components of an exemplary network system in which the methods described hereinafter may be employed.

With reference to the figures, a system and methods are hereinafter described for allowing a user to quickly access product information and/or commerce functionalities as related to one or more products that are associated with an electronic document, such as a web page, a PDF document, a spreadsheet, a database informational display, etc., that is currently being viewed by the user in a corresponding electronic document viewing program, such as an Internet browser, PDF viewer, etc. To this end, and without limitation, a vendor may make available to the user a program extension, such as a browser plug-in, that will allow the system to utilize cross-referencing information to thereby provide to the user product information and/or commerce functionalities that are relevant to a product that is being shown in or otherwise being described in an electronic document that is currently being viewed by the user via use of the program. In this manner, a first vendor, e.g., vendor A, can, for example, create a program extension that will function to use product information, such as a product image, a product stock keeping unit number or SKU, product description, or the like, that is associated with an electronic document being viewed by a user to cause the electronic document that is currently being viewed by the user to be directly and/or indirectly supplemented with any product information (e.g., a stock keeping unit (SKU) number, product details, pricing (which may or may not be user specific)) and/or commerce functionalities of vendor A that is determined to be relevant to product information that is associated with the electronic document that is currently being viewed by the user. For this purpose, one or more cross-referencing tables can be utilized that will function to map product information associated with the electronic document, e.g., a product SKU as shown in a second vendor, e.g., vendor B, web page or an image of product as shown in a vendor B web page that is currently being viewed by a user, to product information and functionalities of vendor A as generally described in U.S. application Ser. Nos. 13/693,676, 13/295,710, and 12/850,149, the disclosures of which are incorporated herein by reference in their entirety. As will become apparent from the description that follows, the cross-referencing tables and functionality utilized to map product information associated with the electronic document to product information and functionalities of the first vendor can reside on the user's device, e.g., the device executing the browser application, the first vendor's server, and/or in the cloud. In still further circumstances, the cross-referencing functionality can utilize information collected from still further web-sites to discern, for example, an SKU of a product of interest to a user—using the functionality described in U.S. Pat. No. 7,546,289 which is incorporated herein by reference in its entirety—whereupon the discerned SKU of the product may be used as the cross-referencing functionality indexing term.

Turning to FIG. 1, an exemplary computing system comprised of a plurality of processing devices 20/68 linked via a network 12, such as a wide area network or the Internet, is illustrated. Processing devices 20, illustrated in the exemplary form of a device having conventional computer components, are provided with executable instructions to, for example, provide a means for a user to access a remote processing device, e.g., a third party server system 67, via the network 12 to, among other things, view electronic documents made available by such third party, to perform a search for products and/or services (individually and collectively referred to hereinafter as "products"), etc. Generally, the computer executable instructions reside in program modules which may include routines, programs, objects, components, data structures, etc. that perform particular tasks or implement particular abstract data types. Accordingly, those skilled in the art will appreciate that a processing device 20 may be embodied in any device having the ability to execute instructions such as, by way of example, a personal computer, mainframe computer, personal-digital assistant ("PDA"), cellular or smart telephone, tablet computer, or the like. Furthermore, while described and illustrated in the context of discrete processing devices 20, those skilled in the art will also appreciate that the various tasks described hereinafter may be practiced in a distributed or cloud-like environment having multiple processing devices linked via a local or wide-area network whereby the executable instructions, required data, etc. may be associated with and/or executed by one or more of multiple processing devices.

It will also be appreciated that, in the case of a user and/or the current location not having the ability to access to the Internet, a further device having all data and logic could communicate with the User's Computing Device via BluTooth or any other protocol that makes sense to accomplish the various goals set forth herein.

For performing the various tasks in accordance with the executable instructions, a processing device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional, external memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated non-transient, computer-readable media allow for the non-volatile storage of computer readable instructions, data structures, program modules and other data for the processing device 20. Those skilled in the art will further appreciate that other types of non-transient, computer readable media that can store data may be used for this same purpose. Examples of such media devices include, but are not limited to, magnetic cassettes, flash memory cards, digital video-disks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser, electronic document viewer/editor, etc.), other program modules 50 (such as program extensions), and/or program data 52. Still further, any such computer-executable instructions may be downloaded to one or more of the computing devices as needed, for example, via a network connection.

A user may interact with the various application programs, etc. of a processing device 20, e.g., to enter commands and information into the processing device 20, through input devices such as a touch screen or keyboard 54 and/or a pointing device 56. While not illustrated, other input devices may include a microphone, a joystick, a game pad, a scanner, a camera, a gesture recognizing device, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

A processing device 20 may also utilize logical connections to one or more remote processing devices, such as vendor server system 68 having one or more associated data repositories 68A in which is stored, for example, product information and user information. In this regard, while the server system 68 has been illustrated in the exemplary form of a computer, it will be appreciated that the server system 68 may, like processing device 20, be any type of device having processing capabilities. Again, it will be appreciated that the server system 68 need not be implemented as a single device but may be implemented in a manner such that the tasks performed by the server system 68 and/or data needed for performance of such tasks are distributed to a plurality of processing devices linked through a communication network, e.g., implemented in the cloud. Additionally, the server system 68 may have logical connections to other third party server systems via the network 12 as needed and, via such connections, will be associated with data repositories that are associated with such other third party server systems.

For performing tasks, e.g., to support commerce related functionalities, the server system 68 may include many or all of the elements described above relative to the processing device 20. By way of further example, the server system 68 includes executable instructions stored on a non-transient memory device for, among other things, handling search requests, providing search results, accepting user ratings/comments information, for displaying user ratings/comments information, for handling orders for goods, for retrieving and providing inventory information, etc. Communications between the processing device 20 and the server system 68 may be exchanged via a further processing device, such as a network router, that is responsible for network routing. Communications with the network router may be performed via a network interface component 73. Thus, within such a networked environment, e.g., the Internet, World Wide Web, or other like type of wired or wireless network, it will be appreciated that program modules depicted relative to the processing device 20, or portions thereof, may be stored in the memory storage device(s) of the server system 68.

Figure 2:
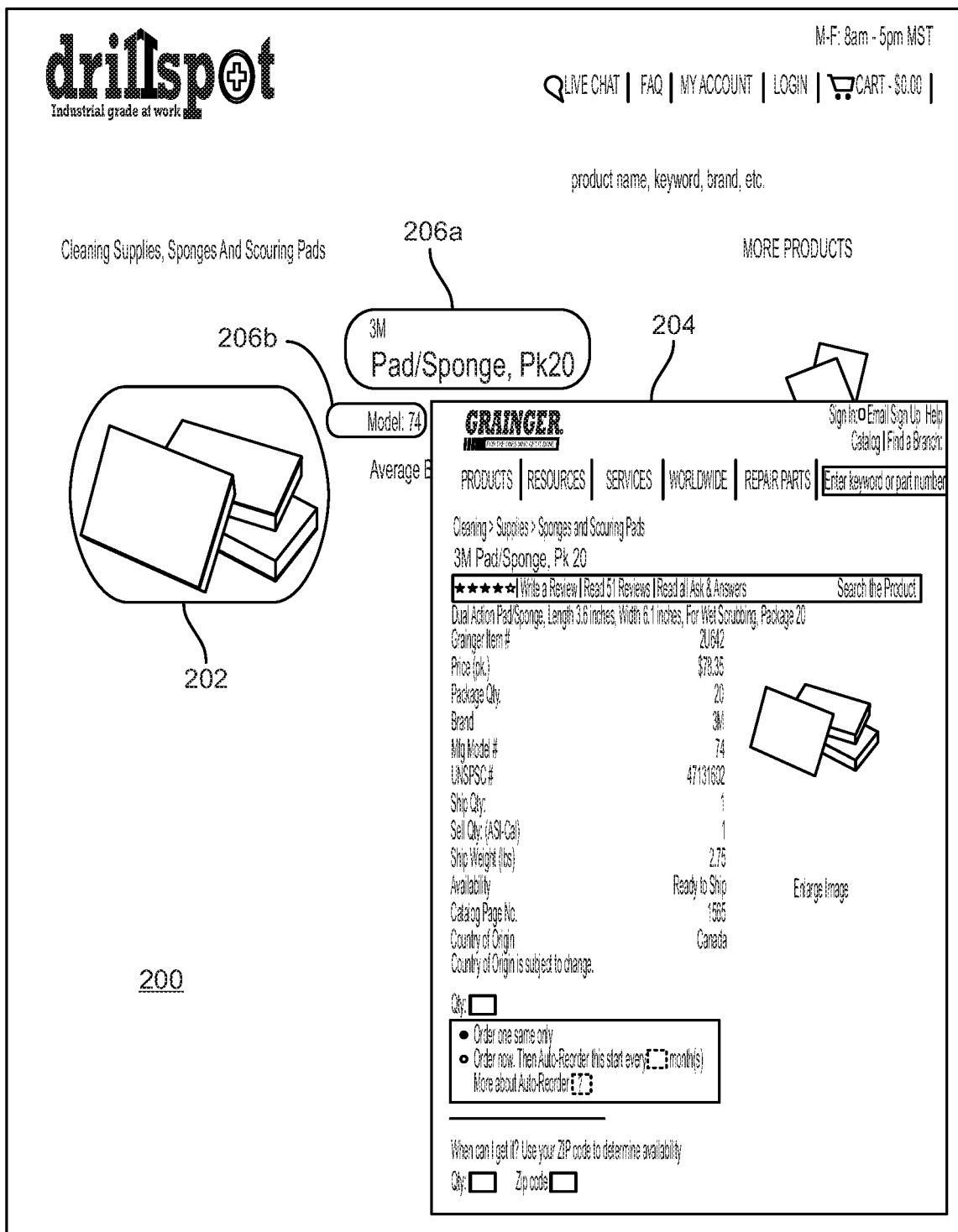
FIGS. 2 and 3 each illustrate an exemplary electronic document being viewed by a user with an exemplary vendor supplement being provided thereto.
Figure 3:
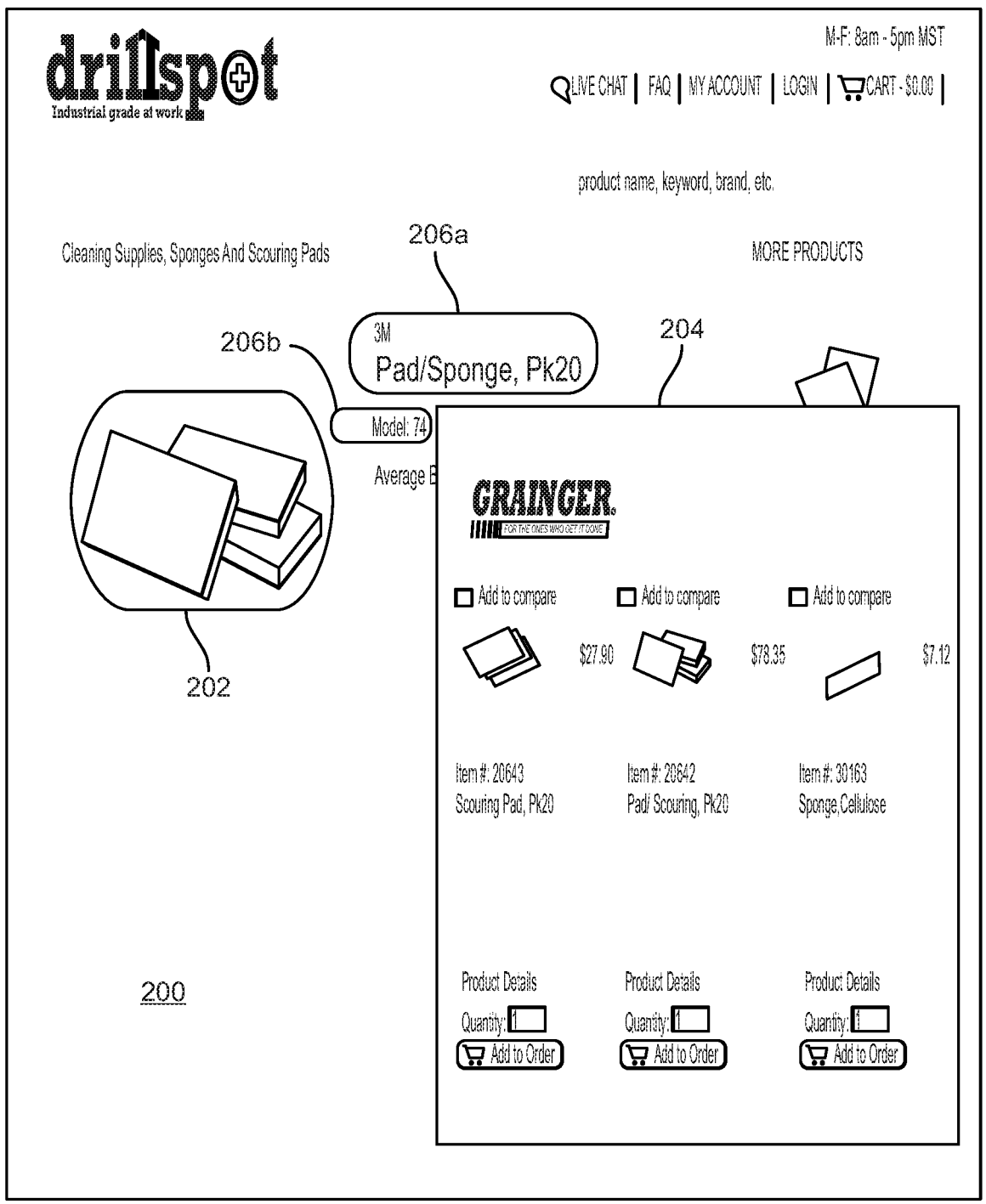

As noted above, the subject system and method functions to provide a user with access to product related information and/or commerce functionalities of a vendor that is related to a product that is determined to be of interest to a user. By way of example, as shown in FIGS. 2 and 3, when a user accesses an electronic document, such as a web page 200 of vendor B, and indicates (whether directly or inferentially) an interest in a product that is shown or otherwise referenced in the electronic document, e.g., the "3M Pad/Sponge," the program extension will function to cause a display of product information and/or commerce functionalities as retrieved from the vendor server system 68 that is related to the product that was indicated to be of interest to the user. While the product information and/or commerce functionality is illustrated as being displayed in a pop-up window 204, it will be appreciated that other manners of displaying the product information and/or commerce functionalities, such as by modifying the electronic document itself (e.g., by overwriting the SKUs of vendor B with the SKUs of vendor A or the like), opening a new tab in a browser window, etc. can be utilized to ensure that the desired product information and/or commerce functionalities are presented to the user without requiring the user to be navigated away from the electronic document that is being viewed. More particularly, in response to the user highlighting (e.g., drawing a box around or the like), mousing over, hovering the cursor over, or otherwise selecting product information within the electronic document, e.g., the product image 202, product describing text 206A and/or 206B, etc., the product information (whether captured from the screen display, retrieved from computer cache memory, or the like) can be uploaded to the vendor system server 68 where it can be analyzed to determine if the uploaded product information corresponds to, i.e., is cross-referenced or indexed to, any product that is within the database of the vendor. In the event that the indicated product information does correspond to a product that is within the database of the vendor, the system server 68, in cooperation with the program extension, will then be used to cause product information and/or commerce functionalities related to the cross-referenced vendor product to be presented to the user in pop-up 204. As illustrated in FIG. 2, the product information and/or commerce functionalities presented to the user in pop-up 204 can be limited to only the product information and/or commerce functionalities that pertain to a single product that is determined to correspond to the product information that was indicated as being of interest to the user. Alternatively, as illustrated in FIG. 3, the product information and/or commerce functionalities presented to the user in pop-up 204 can relate to a single product that most closely or actually corresponds to the product information indicated as being of interest to the user as well as like products that are determined to be alternatives to or similar to a product represented by the product information that was indicated as being of interest to the user. In the example illustrated in FIG. 3 the commerce functionalities provided to the user in the pop-up can include functionality for allowing the user to compare selected ones of the multiple products that have been determined to be relevant to the product information that was indicated as being of interest to the user. It is also contemplated that the product information and/or commerce functionalities like that illustrated in illustrated in FIG. 3 can be made available to the user in circumstances where product information for multiple products are indicated to be of interest to a user. In this regard, various techniques can be utilized for allowing a user to indicate that plural images and/or text for multiple products associated with the displayed electronic document are of interest to the user, such as by allowing the user to drag and drop images and/or text corresponding to multiple different products of interest into a designated area of the presented document or otherwise made available by the document viewing program, by allowing for the highlighting or selection of multiple images and/or text, etc.

In some circumstances, pricing information for a product, to the extent available, can also be captured from the electronic document being viewed by the user and, if such pricing is determined to be acceptable to the vendor, such captured pricing information can be used in the product related information presented to the user in lieu of pricing information that would otherwise be obtained from the vendor system database 68A. To this end, the vendor system 68 may specify a predetermined dollar amount or percentage from which the pricing for the vendor product can be reduced when considering pricing information captured from the electronic document for the purpose of provide competitive pricing. In the event such competitive pricing is to be offered, the competitive pricing will be tracked by the vendor system server 68 throughout the ordering and purchasing process. For logged in users (e.g., a vendor cookie is detected), user specific pricing can be used as applicable. For such recognized users, the product information and/or services returned could also include user specific information and/or services such as links to personal lists, links to prior order history to information, etc.

It will also be appreciated that the electronic document can be scanned/parsed upon being loaded into the electronic document displaying program to thereby attempt to cross-reference any product related information contained therein to product information and/or commerce functionality offered by the vendor prior to the user indicating that any particular product information contained within the electronic document is of interest to the user. In this manner, the potentially relevant product information and/or commerce functionalities can be pre-loaded to the user's computing device at a point in time prior to the need to display the same to the user.

It will also be appreciated that the product images with the electronic documents that are used to locate product information and/or commerce functionalities for display to a user need not be limited to photographs or images of actual product but can instead by hand drawn images or wire images such as found in a parts diagram or a user's manual, CAD drawings, videos, printer files, or the like without limitation.

It will be further appreciated that the commerce functionalities presented to the user can include mechanisms for allowing the user to refine search results when multiple different vendor products are capable of matching the product information that has been determined to be of interest to a user. For example, if an image of a motor or a description of a motor is determined to be of interest to the user and multiple different motor products of the vendor might correspond to the product information, the commerce functionalities that are caused to be displayed to the user can include a motor match selection guide and/or a filtering algorithm which can be used by the user to locate a specific motor that might be of interest to the user. As further described in U.S. application Ser. No. 13/568,927 which is incorporated herein by reference in its entirety, when certain parametric values for the product can be discerned from the image and/or text indicated as being of interest to the user, such parametric values can be used to pre-populate the selection guide when presented to the user.

While described in the context of a selection guide being presented to the user, it will be appreciated that other well-known functionalities for performing search refinement, such a drill down menuing, can be provided for this same purpose. For example, refinement can be provided by causing the system to present to the user a listing of products that the system has discerned as being possible relevant matches for the product that has been indicated to be of interest to the user. In this manner, the user may then select from the listing one or more of the presented vendor products whereupon the system will respond by providing to the user the relevant product information for the one or more selected products in the manner described above. In the event that multiple possible matches are provided to the user for selection by the system, the multiple possible matches could be ranked by the system within the listing provided considering, for example, product parametric values extracted the Web page being viewed, prior purchasing history of the user, etc.

Yet further, it will be appreciated that the functionalities made available to the user can provide a means for a user to further refine the product that is caused to be presented to the user. For example, the functionalities may allow the user to change the sizing of, color of, ornamentation of, text of, or the like of the product information that is first caused to be presented to the user. In this manner, any changes made to the product information can be ported to the vendor and used when, for example, the user indicates a desire to purchase the product as modified by the user.

It is likewise contemplated that the commerce functionality that can be offered to the user might provide access to a customer service representative, for example via use of an on-line text or audio chat.

In certain circumstances the system may additionally provide for the automatic presentation of (or provide access to) a comparison table which can include comparison data for the $1^{st}$ vendor product and one or more of the $2^{nd}$ vendor product that is cross-referenced to the $1^{st}$ vendor product. Thus, it will be appreciated that the product related information retrieved for the second vendor of product can include such tables, text, images, links, HTML, and/or the like without limitation.

It will be still further appreciated that the commerce functionalities presented to the user can include mechanisms for allowing a user to obtain parts information for a product indicated as being of interest in an electronic document being viewed, e.g., a motor. The functionalities described herein can then be likewise employed with the displayed parts information, e.g., an exploded view of the product and/or a parts listing, to thereby allow the user to indicate that one or more part images and/or part text entries within the displayed parts information, e.g., a supplemental electronic document that was caused to be displayed, are of interest to the user whereupon information and/or functionalities relevant to such parts can be presented to the user in the manner above described whether in a further pop-up or in the same pop-up window.

In an embodiment wherein the electronic document is itself altered as it is being displayed to the user, it is contemplated that the determined relevant product information from the vendor, e.g., a product SKU of the vendor, links, images, etc., can be merely substituted for the like product information shown in the electronic document. Furthermore, it is contemplated that this substituted product information can be made interactive, i.e., can act as a link, whereupon interaction with the substituted product information can be used by the system to cause the display of further product information and/or related commerce functionalities in a pop-up of the like as disclosed above. The attention of the user can be further drawn to any substituted product information by having the substituted product information highlighted, underlined, bolded, changed in font size, changed in color, or the like within the electronic document.

It is also contemplated that the system can be interactive. For example, the plug-in can provide a drop-box or the like into which a user can drag information from the displayed Web page, e.g., images and/or words, whereupon the information captured from the Web page in this manner can be utilized by the system to discern relevant product information from the vendor as describe above.

It is additionally contemplated that the plug-in could be intelligent such that web pages of different vendors are parsed considering conventions that are used by the different vendors when presenting product information. For example, if vendor A always places a product image below related product text while vendor B always places a product image above related product text, the intelligent plug-in would function to parse the web page of vendor A and vendor B differently to maintain related information together while considering the web page creation conventions of the different vendors.

It is further contemplated that the plug-in could be used to simply capture/copy all or some of the information presented in an electronic document for use in populating a database, e.g., to create a corresponding list, shopping cart, or the like for a user by use of the information captured.

Still further, it is contemplated that captured information that cannot be cross-referenced can be used in connection with functionality that allows the product to be purchased from the first vendor via use of the second vendor's web site system, i.e., the second vendor would act as an agent for the user in purchasing an item directly from the first vendor.

It is additionally contemplated that the plug-in can be provided with the ability to navigate to and then scrape additional web pages to thereby obtain product information associated with a first vendor for use in providing product information and/or functionalities associated with a second vendor. For example, when a user signs-in to a website of a first vendor via use of their browser having the plug-in, the plug-in may automatically look for links embedded within the web page that navigate to/lead to an order history web page for the user. As will be appreciated, the order history web page will have the SKUs and product information for items that were previously purchased by the user from that first vendor. Once the SKU numbers (or other product information) are extracted from the navigated to web page, the system may cross references the obtained information to locate exact or near matches with product that is being sold be the second vendor. The cross-referenced product information may then be stored in a database associated with the second vendor's web site in association with one or more new or existing personal lists inside that user's account on the second vendor's web site. Additionally, the SKUs for the newly cross referenced products may be sent to an automatic quoting system associated with the second vendor's web site which functions to assign prices to each cross-referenced SKU. As noted previously, the pricing information may be standard pricing at the second vendor's web site, user specific pricing at the second vendor's web site, or pricing that is determined using information gathered from the visited web pages, such as date purchased information, quantity purchased information, competitor price information, etc. In the latter example, the pricing that is determined via use of information gathered from the competitor may also consider information that is already known about the user and stored with the second vendor's web site, such as the users past purchasing history with the second vendor, the industry that user is in, the number of employees that work at the user's location/company, the job role of the user, etc. A quote form may be created with product information and pricing of the cross-referenced SKUs and be caused to be displayed in the browser, emailed to the user, or the like.

It is to be understood that such navigation and scraping can be performed automatically each time the plug-in determines that a user has accessed any web site that is not associated with the second vendor or at predetermined times considering a number or past visits to a competitor's web site and/or a time between visits to a competitor's web site. It will also be appreciated that the automated navigation to and scraping of the web pages may first require approval of the user.

It will also be appreciated that any quote prepared for a user per the above may be first sent to a representative of the second vendor for approval or the like before being provided to the user.

In yet another example the browser plug-in may prompt the user to inquire whether the user wants the cross referencing to bias its cross references according to various parameters such as: made in USA, private label, national brands, exact matches only (vs. functional equivalents), "green" products, etc.

It is further contemplated that the plug-in can be provided with functionality to monitor the user's interactions with web pages of the first vendor's web site. Such functionality may be invoked upon the plug-in determining that the user has accessed the first vendor's web site, i.e., a web site that is not the second vendor's web site. With such functionality, the plug-in can monitor the user's clicks and hovers whereby the user's interactions can be associated with one or more products. For example, if the user clicks on a link to request availability information for a given product that is being offered for sale by the first vendor, the system may use scraped product information and the monitored user interaction to provide the user with availability (the corresponding functionality) and a price quote for a cross-referenced product that is being sold by the second vendor. As described above, the provided information may be caused to be displayed in the browser and/or emailed to the user as desired.

As a further example, the plug-in can be used to detect the refinement parameters on the competitor's website which have been selected by the user. If the plug-in is monitoring several types of search results pages (e.g., row results, item detail, pages, parametric drill-down searches), then information about the user's preferences can be discerned. Thus, if the user is looking for a hammer and they have sorted the price from least to most expensive, the cross referencing that takes place on second vendor's system can bias the cross-referencing results towards low-cost hammers. Similarly, if the user has selected a particular brand name for a "hammer" search, then that brand name can be matched when the cross reference is performed. Other types of user-selected parameters might include a private label, star-rating, or even a particular parameter value. So, in the case of hammers, if the user selected a 16 ounce hammer head weight, then that parametric value can be used when performing the cross reference operation. In all cases, using the user parameter selections can aid in performing more accurate cross referencing for the user when they receive the relevant information.

It will also be appreciated that, when the system is utilized to prepare a quote, it may make sense to also have quotes for 1-to-many cross references. For example, when cross-referencing cone coffee filters and it is found that the second vendor sells 5 functionally equivalent SKUs to the one the user has previously purchased, is hovering over, etc., the quote that is provided to the user can have a comparison table so the user can see the differences between the SKUs along with the price for each SKU. Again, this quoting process could be performed in near real-time, with the results quickly showing up in the browser of the user. Yet further, the plug-in can request a custom PDF catalog be emailed back to the user using such collected information where the custom catalog contains pages from another existing (e.g., paper) catalog which minimally contains the items that were crossed referenced by the system. In this way the user can be merchandised to, allowing the user to see in the PDF catalog's similar and related (recommended) products that were crossed referenced to.

Still further, it will be understood that spidering of the competitor's web site allows for other interesting, useful things to occur. For example, if a user is ordering SKU X from a competitor, the system can link to the item details page for that SKU and spider the star-ratings for it. The system can then bring this information into the quote form generated by the system, reminding the user of that rating. Moreover, if the second vendor's web site does not have a star-rating for the crossed-referenced SKU, the second vendor's system can ask the user if they agree with that rating and to write their review (since they did already buy it) for the second vendor's system. In addition, if the star-rating is high, the second vendor's system can confidently reach out to other users of the second vendor's system and likely receive additional reviews from such users, which should also be high.

Still further, it will be appreciated that another part of the competitor's web site that can be navigated to and scraped is the shopping cart. Because users often build shopping carts and do not immediately place the order, a full shopping cart could be processed and a competitive quote could be generated. As before, such navigation and scraping can take place in an automated fashion so that the plug-in is looking for any number of web pages or actions that take place on the competitor's site and collect information from different places that all could be used for generating quotes. Similarly, when personal lists and order history is navigated to and scraped from the competitor's web site, keywords from descriptions can be captured. These keywords can be used to highlight opportunities on the second vendor's web site to buy products that the user already bought on the competitor's site. For example, if the user previously purchased a ball pein hammer, the HAMMERS category can be highlighted to indicate that a product inside that part of the product hierarchy is sold by the second vendor. Further, when the user clicks on HAMMERS, this would reveal a sub-category that would be highlighted. This would continue until the corresponding ball pein hammer SKU on the second vendor's web site is highlighted. In addition to or alternatively, this functionality could also be provided in a type ahead, keyword search dropdown box. Thus, if the user types in HAMMER in the input box while visiting the second vendor web site, an auto suggest might recommend BALL PEIN HAMMERS with special highlighting to indicate there is a ball pein hammer on the second vendor's web site that corresponds to a ball pein hammer the user previously purchased from the competitor's site.

While various concepts have been described in detail, it will be appreciated by those skilled in the art that various modifications and alternatives to those concepts could be developed in light of the overall teachings of the disclosure. For example, while various aspects of this invention have been described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A non-transient computer-readable media having computer executable instructions stored thereon which, when executed by a processing device, provides to an electronic document viewing program a feature that uses product information contained within an electronic document obtained from a first vendor that is being rendered by the electronic document viewing program to obtain product information from a second vendor via a web site that is associated with the second vendor when the web site associated with the second vendor is otherwise unlinked to the electronic document itself, the instructions performing steps comprising:

in direct response to a first electronic document of a web site associated with the first vendor being accessed by a user, automatically parsing the first electronic document to locate a link that navigates to a second electronic document of the web site associated with the first vendor having order history information for the user;

automatically accessing the second electronic document via use of the located link;

in direct response to the second electronic document of the web site associated with the first vendor being accessed, automatically parsing the second electronic document of the web site associated with the first vendor to extract from the second electronic document information related to a first product being offered for sale by the first vendor;

using the information related to the first product being offered for sale by the first vendor as extracted from the second electronic document to discern an identifier for a second product being offered for sale by the second vendor that has been cross-referenced to the information related to the first product being offered for sale by the first vendor;

directing the electronic document program to use the discerned identifier for the second product being offered for sale by the second vendor to retrieve from the web site associated with the second vendor information related to the second product being offered for sale by the second vendor;

causing the electronic document viewing program to display the information related to the second product being offered for sale by the second vendor wherein the information related to the second product being offered for sale by the second vendor, when displayed, is associated with at least one user interface element having an associated commerce related functionality that is executable by the web site associated with the second vendor; and in response to the user activating the at least one user interface element, causing a communication to be transmitted to the web site associated with the second vendor, the communication including a command to have the web site associated with the second vendor execute the commerce related functionality that is associated with the activated at least one user interface element.

2. The non-transient computer-readable media as recited in claim 1, wherein the second electronic document comprises a shopping cart page.

3. The non-transient computer-readable media as recited in claim 1, wherein the command comprises data for instructing operation of a commerce related functionality that causes the web site associated with the second vendor to add the second product to a shopping cart maintained by the web site associated with the second vendor.

4. The non-transient computer-readable media as recited in claim 1, wherein the command comprises data for instructing operation of a commerce related functionality that causes the web site associated with the second vendor to initiate a purchase of the second product from the second vendor.

5. The non-transient computer-readable media as recited in claim 1, wherein the command comprises data for instructing operation of a commerce related functionality that causes the web site associated with the second vendor to add the second product to a list maintained by the web site associated with the second vendor.

6. The non-transient computer-readable media as recited in claim 1, wherein the information related to the second product being offered for sale by the second vendor retrieved from the web site associated with the second vendor and the at least one user interface element having an associated commerce related functionality that is executable by the web site associated with the second vendor is displayed in a pop-up window.

7. The non-transient computer-readable media as recited in claim 1, wherein the step of parsing the second electronic document comprises extracting from the second electronic document at least a stock keeping unit identifier and pricing for the first product.

8. The non-transient computer-readable media as recited in claim 7, wherein the instructions upload data representative of the extracted pricing for use by the web site associated with the second vendor to determine pricing for the product being offered for sale by the second vendor.

9. The non-transient computer-readable media as recited in claim 7, wherein the instructions upload data representative of the extracted stock keeping unit identifier and pricing for the first product for use by the web site associated with the second vendor to populate a product list for the user as maintained by the second vendor.

* * * * *